(12) United States Patent
Pai

(10) Patent No.: US 7,818,708 B2
(45) Date of Patent: Oct. 19, 2010

(54) METHOD AND SYSTEM FOR DEVELOPING POST-LAYOUT ELECTRONIC DATA AUTOMATION (EDA) APPLICATIONS

(75) Inventor: Ravi R Pai, Bangalore (IN)

(73) Assignee: SoftJin Technologies Private Limited, Bangalore, Karnataka (IN)

( * ) Notice: Subject to any disclaimer, the term of this patent is extended or adjusted under 35 U.S.C. 154(b) by 0 days.

(21) Appl. No.: 11/912,144

(22) PCT Filed: Nov. 10, 2006

(86) PCT No.: PCT/IN2006/000445
§ 371 (c)(1),
(2), (4) Date: Oct. 20, 2007

(87) PCT Pub. No.: WO2007/057921
PCT Pub. Date: May 24, 2007

(65) Prior Publication Data
US 2008/0229267 A1 Sep. 18, 2008

(30) Foreign Application Priority Data
Nov. 21, 2005 (IN) .......................... 975/CHE/2005

(51) Int. Cl.
*G06F 17/50* (2006.01)
(52) U.S. Cl. .................. 716/19; 716/8; 716/9; 716/10; 716/11; 700/97
(58) Field of Classification Search ............... 716/8–11, 716/19; 700/97
See application file for complete search history.

(56) References Cited

U.S. PATENT DOCUMENTS

| | | | |
|---|---|---|---|
| 5,530,372 A * | 6/1996 | Lee et al. ..................... | 324/758 |
| 7,356,374 B2 * | 4/2008 | Suttile et al. .................. | 700/97 |
| 7,401,319 B2 * | 7/2008 | Horng et al. .................. | 716/21 |
| 7,546,232 B2 * | 6/2009 | Brooks et al. ................ | 702/183 |

* cited by examiner

*Primary Examiner*—Naum B Levin
(74) *Attorney, Agent, or Firm*—Prakash Nama; Global IP Services, PLLC

(57) ABSTRACT

A method and system for processing geometrical layout design data to manufacture an electronic circuit is provided. The method includes extracting the geometrical layout design data from one or more data-format files. The method further includes segregating the geometrical layout design data extracted from one or more data-format files into each of a structural data, a spatial data, and a raw-geometry data. Thereafter, one or more predefined operations are performed on one or more of the structural data, the spatial data, and the raw-geometry data.

16 Claims, 7 Drawing Sheets

METHOD AND SYSTEM FOR DEVELOPING POST-LAYOUT ELECTRONIC DATA AUTOMATION (EDA) APPLICATIONS

RELATED APPLICATION DATA

This application is a complete patent application in relation of Indian Patent Application Serial No. 975/CHE/2005 filed on Jul. 21, 2005 entitled "Methodology for post-layout EDA application development toolkit.

FIELD OF THE INVENTION

The invention generally relates to Electronic Design Automation (EDA). More specifically, the invention relates to development of post-layout EDA applications.

BACKGROUND OF THE INVENTION

The design and manufacturing process of an electronic circuit can be broadly divided into two stages, i.e., a pre-layout design stage and a post-layout design stage. Examples of the design and manufacturing process of electronic circuit may include, but are not limited to design of manufacturing processes of Integrated Circuits (IC), Printed circuit Boards (PCB), Micro Electro Mechanical Systems (MEMS), and Multi Chip Modules (MCM). In the pre-layout design stage a circuit design is transformed into a physical layout data. The physical layout data includes details of physical locations of the circuit elements, which are used in the design of an electronic circuit, on the electronic circuit. Thereafter, in the post-layout design stage, the physical layout data is converted into geometric layout design data, which is used for manufacturing the electronic circuit. The geometric layout design data is generated and stored in a number of data-format files. Examples of the input and output data-format files, may include, but are not limited to, Graphic Data System-II (GDSII™) data-format file, Open Artwork System Interchange Standard (OASIS), MEBES™, JEOL™, VSB-11/12™, OASIS-VSB™, Gerber™, Library Exchange Format/Design Exchange Format (LEF™/DEF™) and a proprietary data-format file which describes the geometric layout design data.

At post-layout design stage, large geometric layout design data is processed. Additionally, as post-layout design stage is the last stage before fabrication of the electronic circuit, therefore, it is essential that accurate and efficient operations are performed on geometric layout design data. The post-layout EDA applications are used to process geometric layout design data. A post-layout EDA application includes a plurality of components to process the geometrical layout design data. The plurality of components may include, but are not limited to data structures, operations, and external interfaces. A post-layout EDA application may be custom designed based on data-format file and target application usage by writing a new code for each component of the post-layout EDA application. Examples of the target application usage may include, but are not limited to, Mask Data Preparation (MDP), Design Rule Checker (DRC), Optical Proximity Collection (OPC), Resolution Enhancement Techniques (RET), Critical Area Analysis (CAA), Dummy Metal Filling, Mask Inspection, Mask/Manufacturing Rule Checker (MRC), Silicon Debugging, Compute Aided Design (CAD) Navigation, Layout Viewers, Layout Analysis and Failure Analysis. This enables efficient performance of a post-layout EDA application for the data-format file and the target application of the post-layout EDA application. Additionally, a post-layout EDA application may be developed using one or more components of existing post-layout EDA applications. This enables development of a stable post-layout EDA application at a reduced cost both in terms of effort and achieving stability and performance. However, a long time period is required to develop a stable post-layout EDA application that can processes the geometric layout design data efficiently with good performance without using one or more components of the existing post-layout EDA applications.

Some design databases, for example, OpenAccess™ and MilkyWay™ provide interoperability with a plurality of post-layout EDA applications through Application Programming Interfaces (APIs). These design databases enable the post-layout EDA application developers to write APIs for integration of a design database with one or more custom design post-layout EDA applications.

Further, the design databases and data-format files store the geometric layout design data in one or more of a flat representation and a hierarchical representation. The flat representation lists each geometrical figure of the geometrical layout design data. This requires large run-time memory for carrying out operations and on-disk memory for storage. The hierarchical representation includes a plurality of cells. A cell in the hierarchical representation includes references to zero or more cells and zero or more geometrical figures. The use of the hierarchical representation reduces the memory space required to store the geometric layout design data. However, implementing or performing some operation, such as, but not limited to spatial operations, on the hierarchical representation may be complex to implement and may be computationally expensive.

There is therefore, a need of a stable and efficient post-layout EDA application EDA Application development platform/toolkit that can interface with (read/write) a plurality of data-format files. Further, there is a need for a data representation of geometric layout design data that requires less memory and is suitable for performing various operations, such as, but not limited to, spatial operations, efficiently so that different target applications can be developed efficiently and quickly.

SUMMARY OF THE INVENTION

An object of the invention is to provide a method and system for developing a post-layout EDA application.

Another object of the invention is to provide a method and system for processing geometrical layout design data, in accordance with an embodiment of the invention.

Yet another object of the invention is to provide a method and system to segregate the geometric layout design data into each of a structural data, a spatial data and a raw-geometry data.

Another object of the invention is to provide a method and system that provides representation methods for representing the structural data that use less memory space and enable efficient performance of operations.

The above listed objectives are achieved by providing a method and system for processing geometrical layout design data to manufacture an electronic circuit. The method includes extracting the geometrical layout design data from one or more data-format files. The method further includes segregating the geometrical layout design data extracted from one or more data-format files into each of a structural data, a spatial data, and a raw-geometry data. Thereafter, one or more predefined operations are performed on one or more of the structural data, the spatial data, and the raw-geometry data.

BRIEF DESCRIPTION OF THE DRAWINGS

The foregoing objects and advantages of the present invention a method and system for developing post-layout Electronic Data Automation (EDA) applications may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
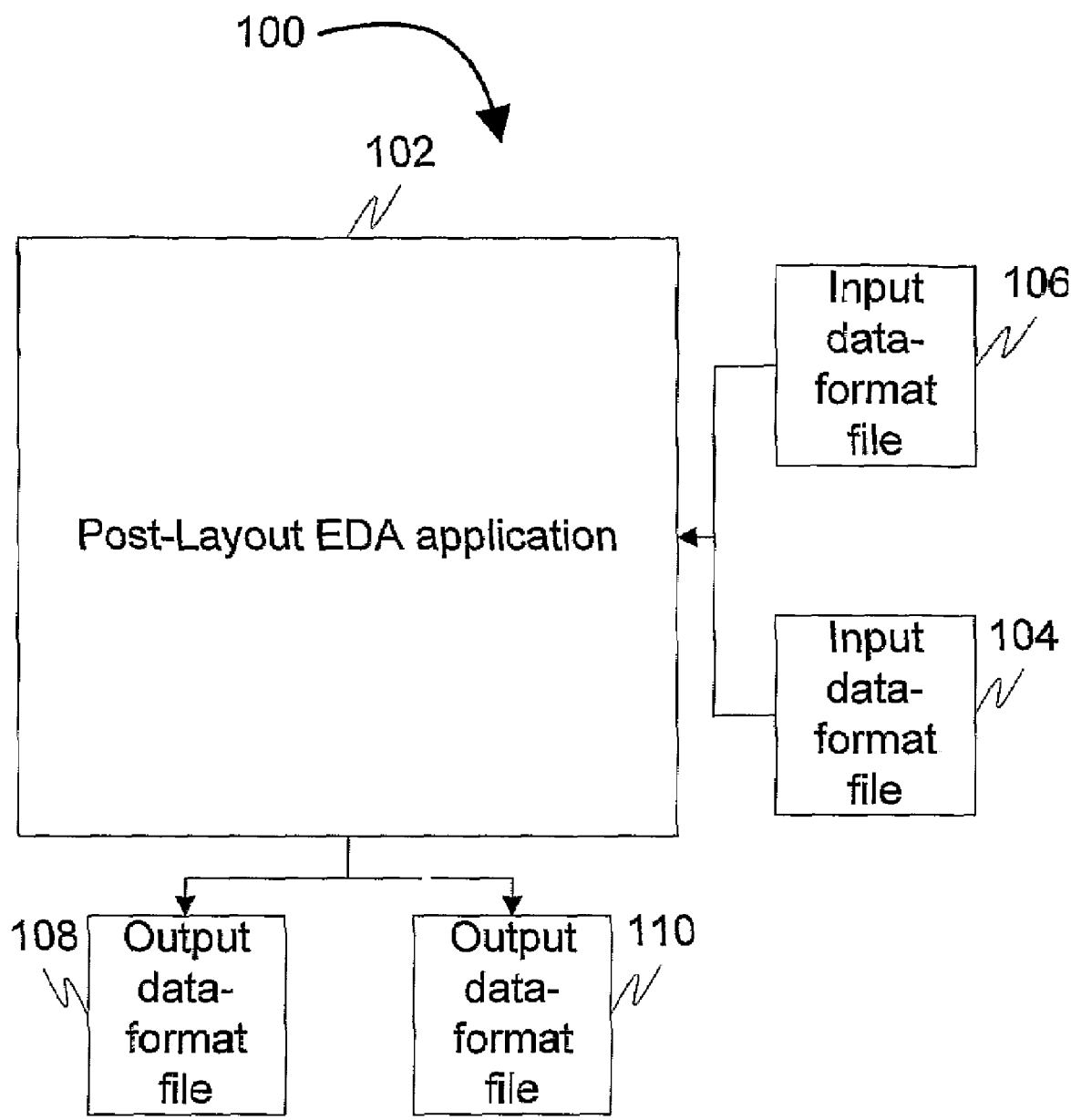
FIG. 1 is a block diagram showing an environment (that is exemplary) for the invention to function.

Before describing in detail embodiments that are in accordance with the present invention, it should be observed that the embodiments reside primarily in combinations of method steps and system components for developing post-layout Electronic Data Automation (EDA) application. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Relative terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

Various embodiments of the present invention provide a method and system for developing post-layout EDA applications. In this method a geometrical layout design data is extracted from one or more input data-format files. Thereafter, the geometrical layout design data is segregated into one or more of a structural data, a spatial data, and a raw-geometry data. One or more predefined operations are then performed on one or more of the structural data, the spatial data, and the raw-geometry data. One or more predefined operations may include, but are not limited to Boolean operations, for example, AND, OR, XOR, SUBTRACT, and NOT. Thereafter, a result of one or more predefined operations performed on one or more of the structural data, the spatial data, and the raw-geometry data may be stored in one or more output data-format files.

FIG. 1 is a block diagram showing an environment 100 (that is exemplary) for the invention to function. Environment 100 includes a post-layout EDA application 102, an input data-format file 104, and an input data-format file 106. It will be apparent to a person skilled in the art that environment 100 may include more than two input data-format files. Environment 100 communicates with one or more of input data-format file 104 and input data-format file 106 to extract geometrical layout design data. Thereafter, post-layout EDA application 102 performs one or more predefined operations on the geometrical layout design data extracted from one or more of input data-format file 104 and input data-format file 106 to generate a layout design of an electronic circuit suitable for manufacturing it. A result of one or more predefined operations performed on one or more of the structural data, the spatial data, and the raw-geometry data may be stored in one or more of an output data-format 108 and an output data-format file 110. It will be apparent to person skilled in the art that environment 100 may include more than two output data-format files.

Figure 2:
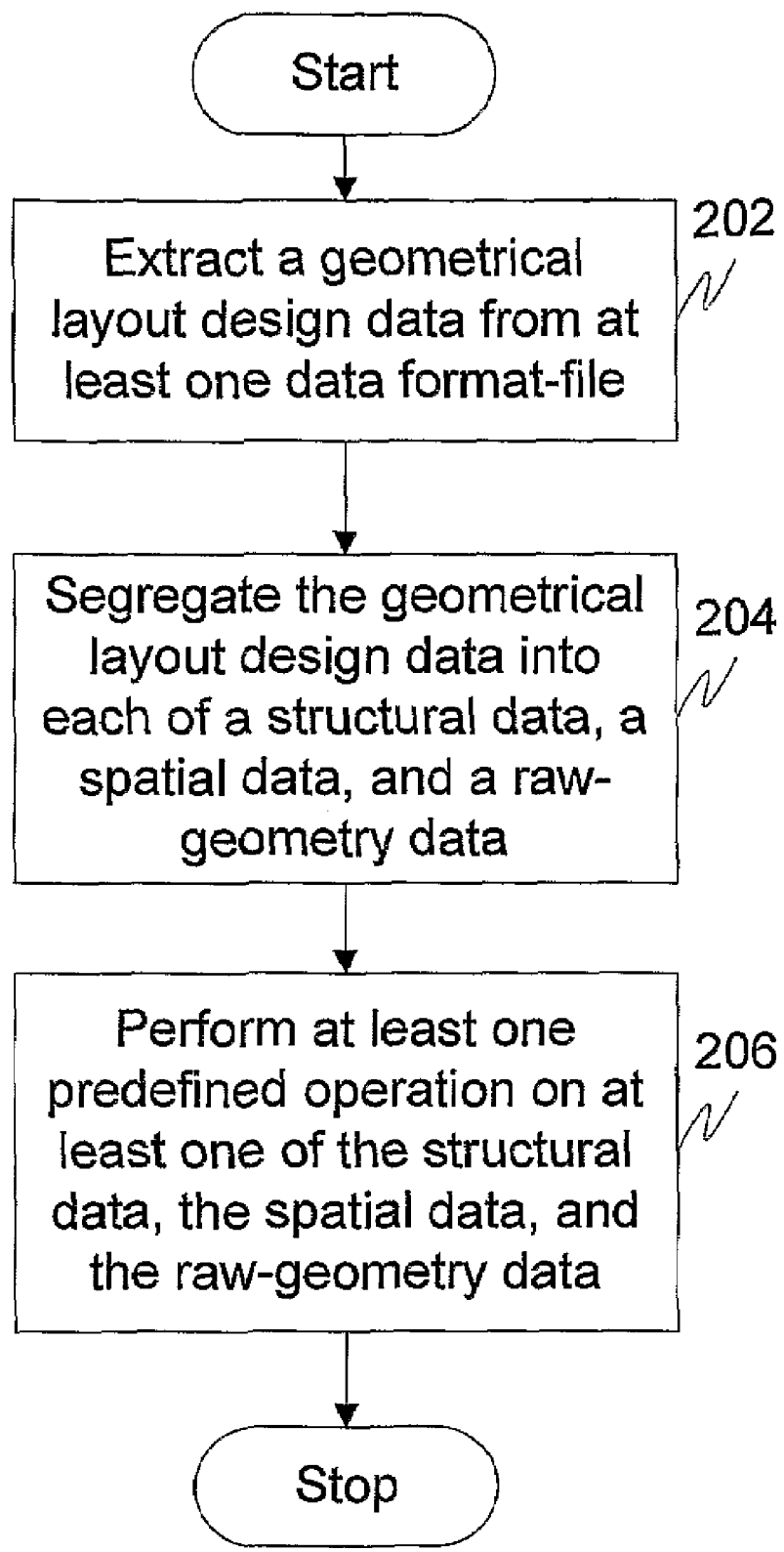
FIG. 2 is a flowchart of a method for processing geometrical layout design data, in accordance with an embodiment of the invention.

FIG. 2 is a flowchart of a method for processing geometrical layout design data, in accordance with an embodiment of the invention. At step 202, geometrical layout design data is extracted from one or more input data-format files. Thereafter, at step 204, the geometrical layout design data is segregated into each of a structural data, a spatial data and raw-geometry data.

After segregating the geometrical layout design data, the structural data is stored in a structural component of a database. The spatial data is stored in a spatial component of the database. The raw-geometry data is stored in a raw-geometry component of the database. This is further explained in detail in conjunction with FIG. 3.

The structural data is represented as one or more of, a hierarchical representation, a hybrid-hierarchical representation, a hybrid-flat representation, and a flat representation. Each of the hierarchical representation, the hybrid-hierarchical representation, and the hybrid-flat representation comprises a plurality of cells. The plurality of cells includes a top cell. In each of the hybrid-hierarchical and the hybrid-flat representations the top cell is a parent of each cell in the plurality of cells. However, in the hierarchical representation the top cell is one of a parent and an ancestor of each cell in the plurality of cells. In an embodiment of the invention, the plurality of cell may additionally include a top dummy cell. The top dummy cell does not include geometrical figures corresponding to it. Further, the top dummy cell includes address of one instance of the top cell. In this case, top cell may be a child cell of the top dummy cell in one of the hierarchical representation, the hybrid-hierarchical representation, the hybrid-flat representation.

A cell in the hierarchical representation of the structural data includes a first pointer to the raw-geometry database component of the database. The first pointer may be a link or a reference to the raw-geometry component. The raw-geometry component of the database includes zero or more geometric figures. The first pointer includes address of geometrical figures corresponding to the cell stored in the raw-geometry component of the database. Therefore, the first pointer is used to access geometrical figures corresponding to the cell. The cell further includes zero or more child cells. Additionally, the cell may include address of each instance of each child cell. Address of each instance is used to traverse from the cell to each instance of each child cell. In an embodiment of the invention, addresses of instances of each child cell that have a repetitive pattern may be stored as a one dimensional or a two dimensional array of addresses. In another embodiment of the invention, addresses of instances of each child cell may be stored as a list of addresses in the cell. The hierarchical relationships among one or more cells may be represented by a Directed Acyclic Graph (DAG) data structure.

The hierarchical representation of the structural data is converted into the hybrid-hierarchical representation of the structural data using a first predefined algorithm. A cell in hybrid-hierarchical representation includes a second pointer to the raw-geometry component of the database. The second pointer includes the address of zero or more geometrical figures corresponding to the cell, in the raw-geometry component. The cell further includes an enumeration data structure. The enumeration data structure includes information that is used to generate the address of each instance of the cell in the top cell. In an embodiment of the invention, the enumeration data structure of a cell is a Partial DAG (PDAG). A PDAG of a cell is a subset of a DAG and includes each ancestor of the cell, each existing link between each pair of ancestors in the DAG, and each existing link between the cell and each parent of the cell in the DAG. This is further explained in detail in conjunction with FIG. 5. In another embodiment of the invention, the enumeration data structure is a list of addresses of each instance of the cell relative to the top cell and is implemented as a List (LIST) data structure.

The hybrid-hierarchical representation further includes an iterator algorithm. The iterator algorithm performs iterations on the enumeration data structure of a cell to generate the address of each instance of the cell. The iterator algorithm depends on the representation of the enumeration data structure. For example, if the enumeration data structure corresponding to a cell stores a list of addresses of each instance of the cell in a LIST data structure, then the corresponding iterator algorithm may traverse the LIST data structure sequentially to generate address of each instance of the cell. Similarly, in another example, if the enumeration data structure corresponding to a cell stores the addresses of each instance of the cell through a PDAG data structure, then the corresponding iterator algorithm may traverse the PDAG data structure hierarchically to generate address of each instance of the cell.

The hierarchical representation of the structural data may be converted into the hybrid-flat representation using a second predefined algorithm. In an embodiment of the invention, the hybrid-hierarchical representation may be converted into the hybrid-flat representation using a third predefined algorithm. A cell in hybrid-flat representation includes a third pointer to the raw-geometry component of the database. The third pointer includes the address of zero or more geometrical figures corresponding to the cell, in the raw-geometry component. The top cell in hybrid-flat representation includes information corresponding to a bounding box corresponding to each instance of each cell in a set of cells. The third pointer of each cell in the set of cells includes address of one or more geometrical figures corresponding to the cell, in the raw-geometry component.

A bounding box corresponding to an instance of a cell is a smallest rectangle that encloses each geometrical figure corresponding to the cell. The bounding box of an instance of the cell may be represented in the top cell by coordinates of endpoints of a diagonal of the bounding box. The spatial information of each geometrical figure in the bounding box is stored relative to coordinates of an endpoint of the diagonal, in the spatial component of the database. Therefore, the coordinates of the endpoints of the diagonal may be used to determine spatial information of each geometrical figure corresponding to an instance of the cell. This is further explained in detail in conjunction with FIG. 6.

The hybrid-flat representation may be converted into the flat representation of the structural data using a fourth predefined algorithm. The flat representation of the structural data includes the top cell. The top cell includes a fourth pointer to the raw-geometry component of the database. The fourth pointer includes address of each geometrical figure in the raw-geometry component of the database. In an embodiment of the invention, each of the hierarchical representation and the hybrid-hierarchical representation may be converted directly into the flat representation of the structural data.

The spatial data stores the spatial information of each geometrical figure within the cells. The spatial data is represented using one or more spatial representations from a set of spatial representations. The set of spatial representations may include, but is not limited to, X/Y sorted edge representation, Voronoi diagrams, Quad-trees and Oct-trees. This is further explained in conjunction with FIG. 7. Further, the raw-geometry data stores the geometrical figures used in the geometrical layout design. The raw-geometry data is represented using each of a plurality of geometrical figures, coordinate representation methods, and a plurality of user-defined properties. The plurality of geometrical figures may include, but are not limited to, squares, rectangles, triangle, Manhattan polygons, any-angle polygons, islands, and trapezoids. The coordinates of the plurality of geometrical figures may be represented using one of data types from a set of data types. The data types may include, but are not limited to, short integer, long, and double. A plurality of user-defined property may be added to the geometrical figures to include user-defined data in the representation of the raw-geometry data. Examples of the plurality of user defined properties include, but are limed to color, layer, net name, and electrical properties. This is farther explained in detail in conjunction with FIG. 7.

Thereafter, at step 206, one or more predefined operations are performed on one or more of structural data, spatial data and raw-geometry data. Examples of operations may include, but are not limited to Boolean operations (for example, AND, OR, XOR, SUBTRACT and NOT), window query on the geometrical layout design, and neighborhood query on the geometrical layout design. The segregated data is represented based on the operation to be performed on one or more of the structural data, the spatial data, and the raw-geometry data. For example, the structural data is represented using hybrid-hierarchical representation for cell-wise operations. Similarly, spatial data is represented using X/Y sorted edge representation for line sweep operations. Alternatively, spatial data is represented using Voronoi diagrams representation for neighborhood query operation. The raw-geometry data is represented using trapezoidal representation for the Boolean operations. Alternatively, the raw-geometry data is represented using island representation for sizing operations. After performing one or more predefined operations on the one or more of the structural data, the spatial data, and the raw-geometry data, one or more results of one or more predefined operations performed on one or more of one or more of the structural data, the spatial data, and the raw-geometry data is aggregated to generate an aggregated result. The aggregated result may thereafter be stored in one or more output data-format files. This is further explained in conjunction with FIG. 3.

Figure 3:
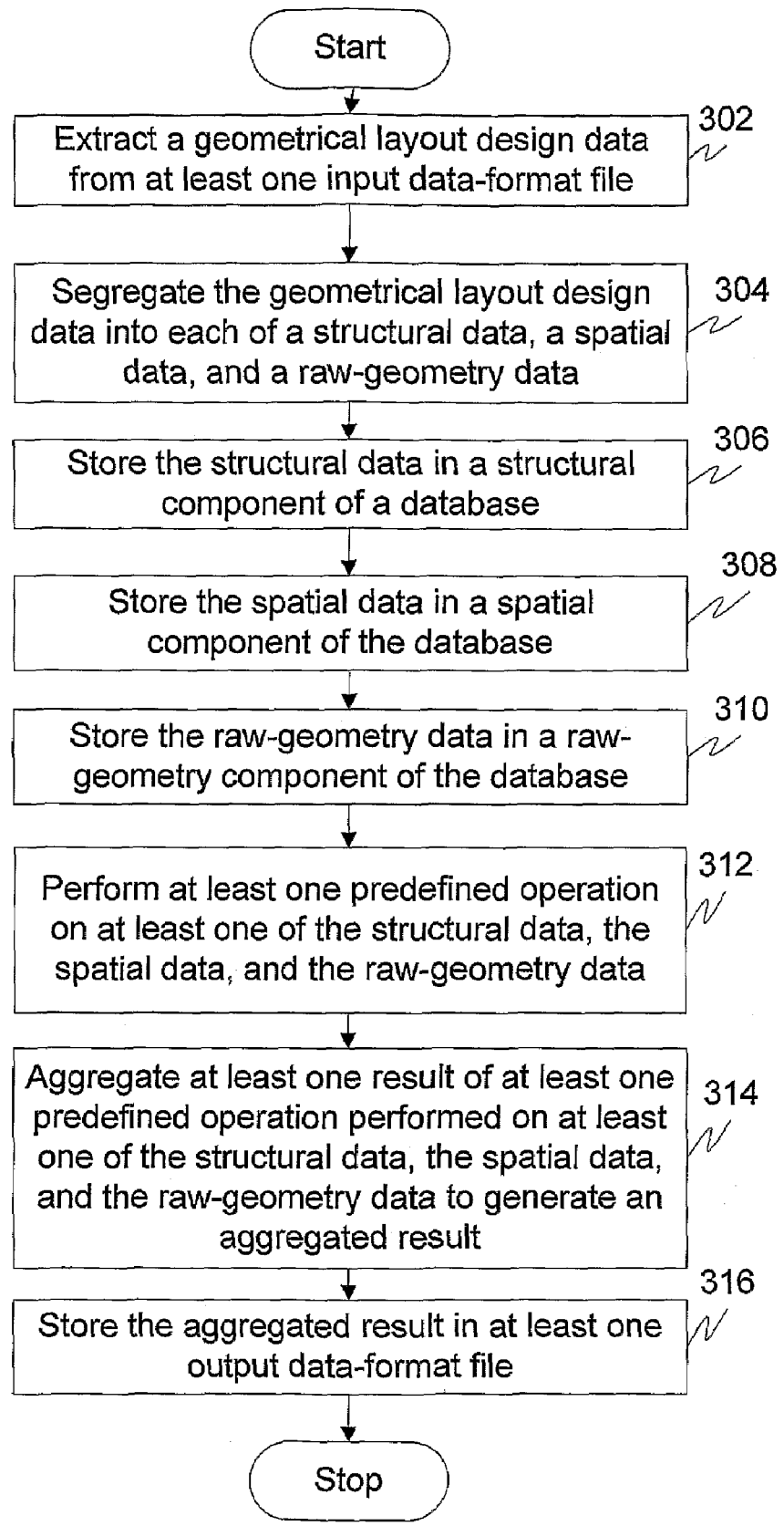
FIG. 3 is a flow diagram illustrating the flow of data through an embodiment of the invention.

FIG. 3 is a flow diagram illustrating the flow of data through an embodiment of the invention. At step 302, the geometrical layout design data is extracted from one or more input file. This has been explained in detail in conjunction with FIG. 2. Thereafter, at step 304, the geometrical layout design data is segregated into each of the structural data, the spatial data and the raw-geometry data. This has been explained in detail in conjunction with FIG. 2.

After segregating the geometrical layout design data, at step 306, the structural data is stored in the structural component of the database. The structural data is stored using one or more of the hierarchical representation, the hybrid-hierarchical representation, the flat representation and the hybrid-flat representation. This has been explained in detail in conjunction with FIG. 2. In an embodiment of the invention, the structural data is stored in a structural database. At step 308, the spatial data is stored in the spatial component of the database. The spatial data is stored using one or more of the X/Y sorted edge representation, the Voronoi diagrams, the Quad-trees and the Oct-trees. Those of the skilled in the art will appreciate that the invention is not limited to the above listed examples of data structures for storing the spatial data. In an embodiment of the invention, the spatial data is stored in a spatial database. At step 310, the raw-geometry data is stored in the raw-geometry component of the database. The raw-geometry data is stored using one or more of the plurality of geometrical figures, the coordinate representation methods, and the plurality of user-defined properties. This has been explained in conjunction with FIG. 2. In an embodiment of the invention, the raw-geometry data is stored in a raw-geometry database.

Thereafter, at step 312, one or more predefined operations are performed on one or more of the structural data, the spatial data and the raw-geometry data. This has been explained in detail in conjunction with FIG. 2. At step 314, one or more results of one or more predefined operations performed on one or more of one or more of the structural data, the spatial data, and the raw-geometry data is aggregated to generate an aggregated result. The structural data, the spatial data and the raw-geometry data may be aggregated to generate the aggregated result. Thereafter, at step 316, the aggregated result is stored in one or more output data-format files.

Figure 4:
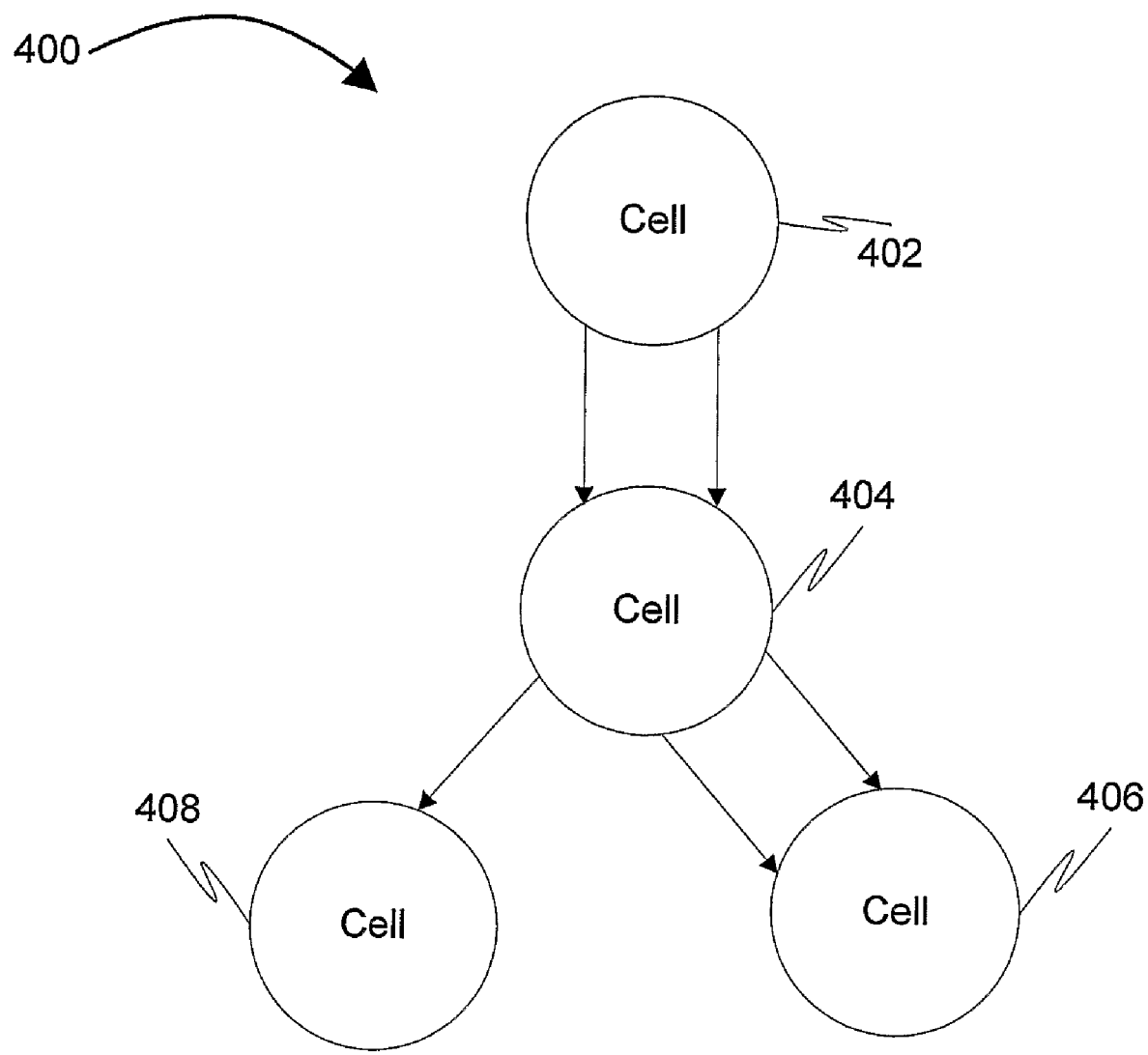
FIG. 4 is a block diagram showing a hierarchical representation of the structural data including a plurality of cells.

FIG. 4 is a block diagram showing a hierarchical representation 400 of the structural data including a plurality of cells. The plurality of cells includes a cell 402, a cell 404, a cell 406, and a cell 408. Cell 402 is the top cell. Therefore, cell 402 is parent of cell 404 and an ancestor of each of cell 406, and cell 408. Cell 402 has an instance. The instance of cell 402 includes address of a first instance of cell 404 and a second instance of cell 404. Additionally, the instance of cell 402 includes a pointer, which has address of zero or more geometrical figures corresponding to cell 402, in the raw-geometry component. Further, cell 404 is the parent of each of cell 406 and cell 408. Therefore, each instance of cell 404 includes the address of two instances of cell 406, and the address of an instance of cell 408. A first instance of cell 404 is parent of a first instance of cell 406 and a second instance of cell 406 and a first instance of cell 408. Therefore, the first instance of cell 404 includes the address of the first instance of cell 406, the address of the second instance of cell 406, and the address of the first instance of cell 408. Further, a second instance of cell 404 is the parent of a third instance of cell 406, a fourth instance of cell 406, and a second instance of cell 408. Therefore, the second instance of cell 404 includes the address of the third instance of cell 406, the address of the fourth instance of cell 406, and the address of the second instance of cell 408. Additionally, each instance of cell 404 includes a pointer to zero or more geometrical figures corresponding to cell 404, in the raw-geometry component.

Further, each instance of cell 406 includes a pointer to zero or more geometrical figures corresponding to cell 406 stored in the raw-geometry component. Additionally, each instance of cell 408 includes a pointer to zero or more geometrical figures corresponding to cell 408, in the raw-geometry component.

Figure 5:
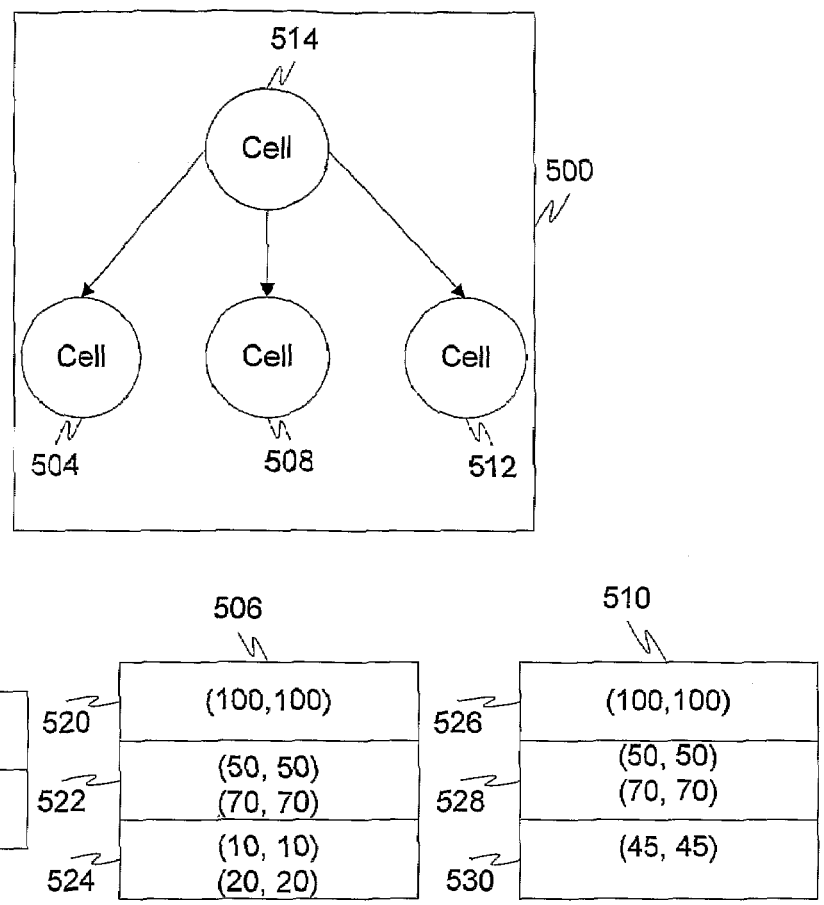
FIG. 5 is a block diagram showing a hybrid-hierarchical representation including a plurality of cells and an enumeration data structure of a first cell, an enumeration data structure of a second cell, and an enumeration data structure of a third cell, in accordance with an exemplary embodiment of the invention.

FIG. 5 is a block diagram showing a hybrid-hierarchical representation 500 including a plurality of cells and an enumeration data structure 502 of a cell 504, an enumeration data structure 506 of a cell 508, and an enumeration data structure 510 of a cell 512, in accordance with an exemplary embodiment of the invention. Hybrid-hierarchical representation 500 is generated from hierarchical representation 400 using the first predefined algorithm. The plurality of cells in hybrid-hierarchical representation 500 include a cell 514 corresponding to cell 402, cell 504 corresponding to cell 404, cell 508 corresponding to cell 406, and cell 512 corresponding to cell 408. Each of the enumeration data structure 502 represents PDAG for cell 504, enumeration data structure 506 represents PDAG for cell 508, and enumeration data structure 510 represents PDAG for cell 512. In hybrid-hierarchical representation 500, cell 514 is a top cell. Cell 514 may be a child of the top dummy cell. The top dummy cell does not include geometrical figures corresponding to it. Further, the top dummy cell includes address of one instance of cell 514. Therefore, cell 514 is parent of each of cell 504, cell 508, and cell 512. The ordinate of the origin of cell 514 is 100 and the abscissa of the origin of cell 514 is 100 in the geometrical layout design. Therefore, coordinate of the origin of cell 514 is represented as (100, 100) in the geometrical layout design. Further, cell 514 has two instances of cell 504. An absolute coordinate of the origin of a first instance of cell 504 is (150, 150) and an absolute coordinate of the origin of a second instance of cell 504 is (170, 170).

Cell 504 further includes an enumeration data structure 502 in hybrid-hierarchical representation 500. Enumeration data structure 502 includes a list 516, and a list 518. List 516 includes the origin of cell 514, i.e., (100, 100). Further, list 518 includes origin of each instance of cell 504 relative to cell 514. Therefore, list 518 includes the origin of the first instance of cell 504 as, (50, 50) and the origin of the second instance of cell 504 as, (70, 70), which are relative to the origin of cell 514.

Further, each of the first instance of cell 504 and the second instance of cell 504 has two instances of cell 508 and an instance of cell 512. Therefore, each of the first instance of cell 504 and the second instance of cell 504 include a first instance of cell 508 and a second instance of cell 508. An absolute coordinate of the origin of the first instance of cell 508 in the first instance of cell 504 is (160, 160) and an absolute coordinate of the origin of the second instance of cell 508 in the first instance of cell 504 is (170, 170). Further, an absolute coordinate of the origin of the first instance of cell 508 in the second instance of cell 504 is (180, 180) and an absolute coordinate of the origin of the second instance of cell 508 in the second instance of cell 504 is (190, 190).

Cell 508 further includes an enumeration data structure 506 in hybrid-hierarchical representation 500. Enumeration data structure 506 includes a list 520, a list 522 and a list 524. List 520 includes the origin of cell 514, i.e., (100, 100). Further, list 522 includes origin of each instance of cell 504 relative to cell 514. Therefore, list 522 includes the origin of the first instance of cell 504 as, (50, 50) and the origin of second instance of cell 504 as, (70, 70). Further, list 524 includes the origin of the first instance of cell 508 and the second instance of cell 508 relative to cell 504. Therefore, list 524 includes the origin of the first instance of cell 508 as, (10, 10) and the origin of the second instance of cell 508 as, (20, 20).

Further, each of the first instance of cell 504 and the second instance of cell 504 includes an instance of cell 512. An absolute coordinate of the origin of the instance of cell 512 in the first instance of cell 504 is (195, 195) and an absolute coordinate of the origin of the instance of cell 512 in the second instance of cell 504 is (215, 215).

Cell 512 further includes an enumeration data structure 510 in hybrid-hierarchical representation 500. Enumeration data structure 510 includes a list 526, a list 528 and a list 530. List 526 includes the origin of cell 514, i.e., (100, 100). Further, list 528 includes origin of each instance of cell 504 relative to cell 514. Therefore, list 528 includes the origin of the first instance of cell 504 as, (50, 50) and the origin of the second instance of cell 504 as, (70, 70). Further, list 530 includes the origin of the instance of cell 512 relative to cell 504. Therefore, list 530 includes the origin of the instance of cell 512 as, (45, 45).

In this exemplary embodiment, a cell-wise operation is performed on hybrid-hierarchical representation 400. When cell-wise operation has to be performed on cell 512, then the iterator algorithm operates on enumeration data structure 510 and computes an absolute coordinate of the origin of the instance of cell 512 using list 526, list 528, and list 530. In case of the instance of cell 512 in the first instance of cell 504, the iterator algorithm adds the origin of the instance of cell 514 stored in the list 526, i.e., (100, 100), the origin of the first instance of cell 504 stored in list 528, i.e., (50, 50), and the origin of the instance of cell 512 stored in list 530, i.e., (45, 45) to generate the absolute coordinates of the instance of cell 512 in the first instance of cell 504 as (195, 195). Similarly, in case of the instance of cell 512 in the second instance of cell 504, the iterator algorithm adds the origin of the instance of cell 514 stored in the list 526, i.e., (100, 100), the origin of the second instance of cell 504 stored in list 528, i.e., (70, 70), and the origin of the instance of cell 512 stored in list 530, i.e., (45, 45) to generate the absolute coordinates of the instance of cell 512 in the second instance of cell 504 as (215, 215).

Figure 6:
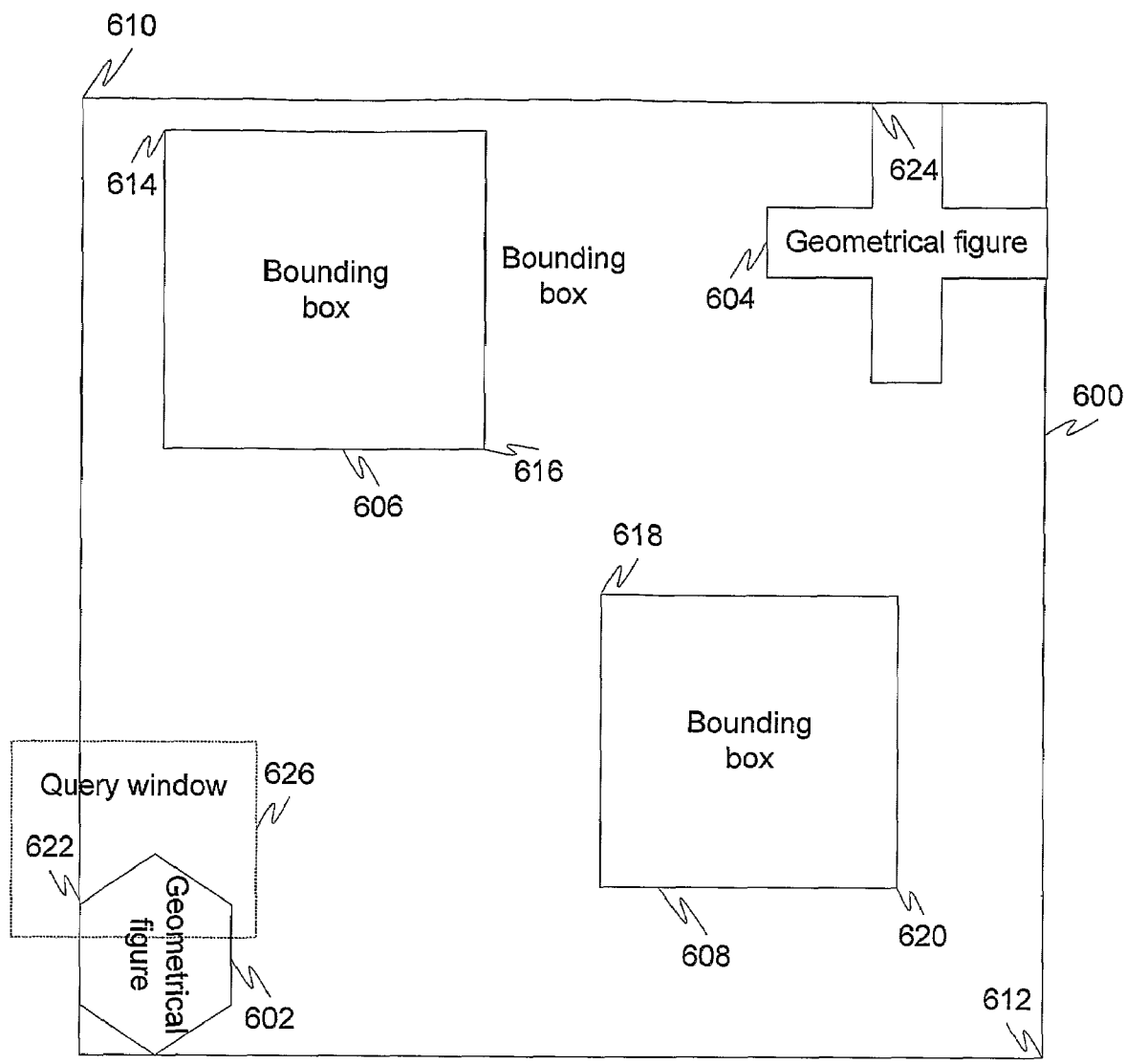
FIG. 6 is a block diagram showing a bounding box corresponding to a first cell in the hybrid-flat representation of the structural data, in accordance with an exemplary embodiment of the invention.

FIG. 6 is a block diagram showing a bounding box 600 corresponding to a first cell in the hybrid-flat representation of the structural data, in accordance with an exemplary embodiment of the invention. The first cell is the top cell. Further, the first cell is a parent of two instances of a second cell, a geometrical FIG. 602 and a geometrical FIG. 604. Therefore, bounding box 600 includes a bounding box 606 corresponding to a first instance of the second cell, a bounding box 608 corresponding to a second instance of the second cell, geometrical FIG. 602 and geometrical FIG. 604.

In the hybrid-flat representation, as a bounding box of an instance of the cell is represented in the top cell by coordinates of endpoints of a diagonal of the bounding box. Therefore, bounding box 600 corresponds to the top cell. Bounding box is represented in the top cell as an absolute coordinate of a point 610, i.e., (110, 110) and an absolute coordinate of a point 612, i.e., (135, 135). Similarly, bounding box 606 is represented in the top cell as an absolute coordinate of a point 614, i.e., (111, 111) and an absolute coordinate of a point 616, i.e., (120, 120). Additionally, bounding box 608 is represented in the top cell as an absolute coordinate of a point 618, i.e., (121, 121) and an absolute coordinate of a point 620, i.e., (130, 130). Further, the spatial information of each geometrical figure in a bounding box is stored relative to coordinates of an endpoint of the diagonal of the bounding box, in the spatial component of the database. Therefore, spatial information of geometrical FIG. 602 and geometric FIG. 604 is stored relative to point 610 and point 612 in the spatial component of the database. An absolute coordinate of a point 622 is represented as, (110, 131) is stored relative to bounding box 600 as, (0, 21). Similarly, an absolute coordinate of a point 624 represented as (129, 110) of coordinate is stored relative to bounding box 600 as, (19, 0).

In this exemplary embodiment, a window query operation is performed on geometrical layout design data. When a query window 626 of the window query operation overlaps geometrical FIG. 602 then point 622 is retrieved by adding the absolute coordinate of point 610 and relative coordinate of point 622. Therefore, point 622 is retrieved as, (110, 131).

Figure 7:
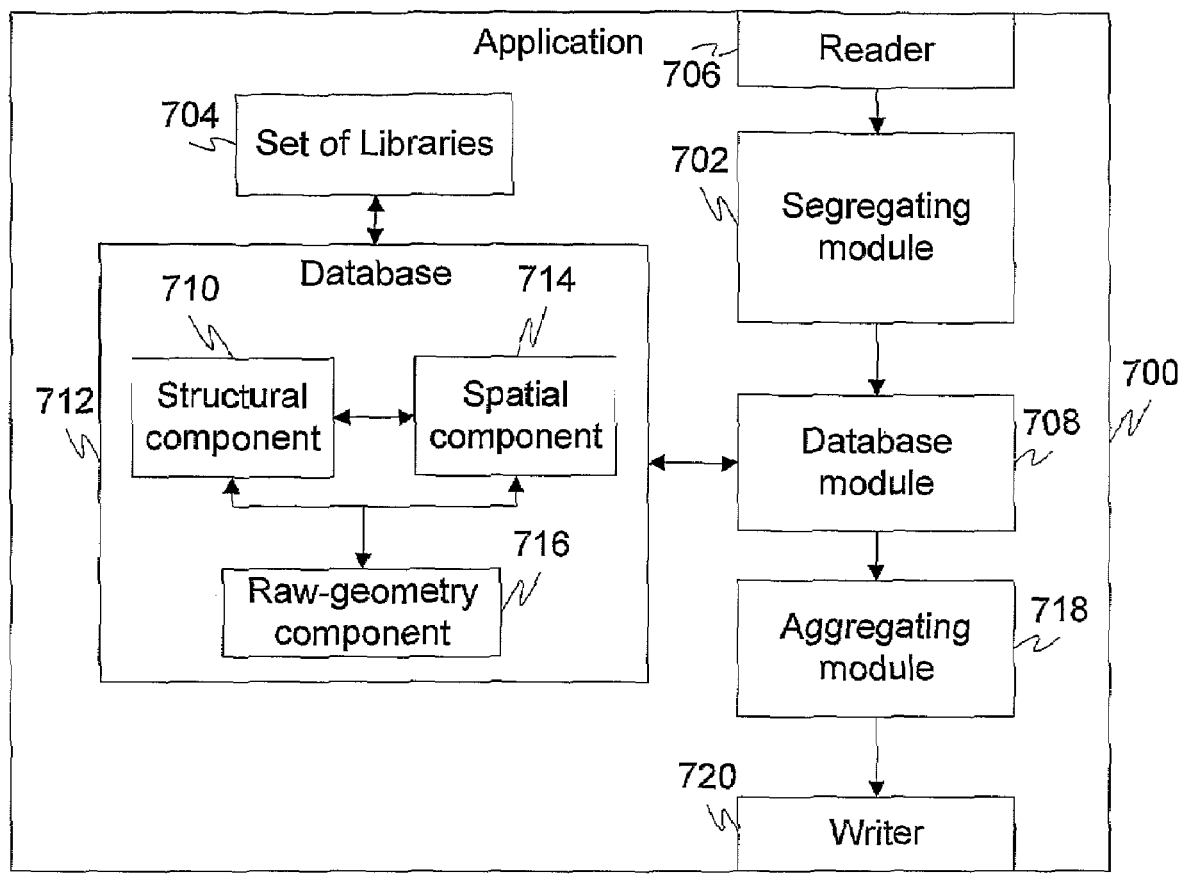
FIG. 7 is a block diagram showing an application for developing a post-layout EDA application, in accordance with an embodiment of the invention.

FIG. 7 is a block diagram showing an application 700 for developing a post-layout EDA application, in accordance with an embodiment of the invention. Application 700 includes a segregating module 702, and a set of libraries 704. Segregating module 702 communicates with a reader 706. Reader 706 extracts geometrical layout design data from one or more input data-format files. Thereafter, segregating module 702 segregates the geometrical layout design data extracted from one or more input data-format files into each of the structural data, the spatial data, and the raw-geometry data. This has been explained in conjunction with FIG. 2. After segregating the geometrical layout design data, a database module 708 stores the structural data in a structural component 710 of a database 712, the spatial data in a spatial component 714 of database 712 and raw-geometry data in a raw-geometry component 716 of database 712. This has been explained in conjunction with FIG. 3.

For each representation of the structural data, structural component 710 communicates with each of spatial component 714 and raw-geometry component 716 through a first Application Programming Interface (API). Similarly, for each representation of spatial data, spatial component 714 communicates with each of structural component 710 and raw-geometry component 716 through a second API. Further, for each representation of raw-geometry data, raw-geometry component 716 communicates with each of structural component 710 and spatial component 714 through a third API. This enables modularity of application 700.

In an embodiment of the invention, each of the first API, the second API, and the third API enable database module 708 and database 712 to maintain consistency in one or more representations of each of structural data, spatial data, and raw-geometry data. For example, spatial data is represented using each of Voronoi diagrams and Quad-tree. In this case, if one or more modifications are made in the Voronoi diagrams representation of spatial data, then database module 708 modifies the Quad-tree representation of the spatial data component 714 in database 712 to maintain consistency of the spatial data.

After storing the segregated geometrical layout design data, the post-layout EDA application performs one or more predefined operations on one or more structural data, the spatial data, and the raw-geometry data. The post-layout EDA application performs one or more predefined operations by loading one or more libraries from set of libraries 704. A library in set of libraries 704 corresponds to one or more predefined operations. Each library in set of libraries 704 is a pre-compiled object code library. This has been explained in conjunction with FIG. 2. In an embodiment of the invention, a library, which is compatible with set of libraries 704, developed by a user may be added to set of libraries 704.

After performing one or more predefined operations, an aggregating module 718 aggregates one or more results of one or more predefined operations performed on one or more of the structural data, the spatial data, and the raw-geometry data to generate an aggregated result. Aggregating module 718 may aggregate the structural data, the spatial data and the raw-geometry data to generate the aggregated result. Thereafter, aggregating module 718 communicates with a writer 720. Writer 720 writes the aggregated result to one or more output data-format files.

Various embodiments of the invention provide methods and systems for developing post-layout EDA application. The post-EDA application so developed segregates the geometric layout design data into each of the structural data, the spatial data and the raw-geometry data. This enables efficient post-layout operation on the geometric layout design data as each of the structural data, the spatial data and the raw-geometry data is readily available. Additionally, one or more representations of each of the structural data, the spatial data and the raw-geometry data may be used depending on the operations to be performed. The representation to be used to represent each of the structural data, the spatial data and the raw-geometry data may be selected at run-time or at the compile time. Additionally, data consistency between one or more data representations is maintained. Further, various embodiments of the invention provide data representation methods that use less memory space and enable efficient performance of operations.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for processing geometrical layout design data in a computer readable data-format file for developing post-layout Electronic Data Automation (EDA) applications, the method comprises:
   using a computer for:
   extracting structural data, spatial data, and raw-geometry data from the geometrical layout design data in the computer readable data-format file into a respective structural, spatial, and raw-geometry components in a database, wherein the raw-geometry data is dimensional, topological, and user-defined data of a plurality of geometrical figures in the geometrical layout design data;
   processing the extracted structural data, spatial data, and raw-geometry data in the database to represent the geometrical layout design data in at least one of a flat representation, a hierarchical-flat representation, a hierarchical representation, and a hybrid-hierarchical representation; and
   performing at least one predefined computing operation on the at least one of the flat representation, the hierarchical-flat representation, the hierarchical representation, and the hybrid-hierarchical representation for developing post-layout EDA applications.

2. The method of claim 1, wherein the extracted spatial data is represented using at least one spatial representation from a set of spatial representations in the spatial data component in the database.

3. The method of claim 1, wherein each of the hierarchical representation, hybrid-hierarchical representation and the hybrid-flat representation comprise a first plurality of cells, the plurality of cells comprises a top cell, wherein the top cell is a parent of each cell in the plurality of cell in each of the hybrid-flat representation and the hybrid-hierarchical representation and the top cell is one of a parent and an ancestor of each cell in the plurality of cells in the hierarchical representation.

4. The method of claim 3, wherein a cell in the hierarchical representation comprises at least one of:
   a first pointer to the raw-geometry component of the database, wherein the raw-geometry component comprises zero or more geometrical figures; zero or more child cells; and address of each instantiation of each child cell.

5. The method of claim 3, wherein a cell in the hybrid-hierarchical representation of the structural data comprises:
   a second pointer to the raw-geometry component of the database, wherein the raw-geometry component comprises zero or more geometrical figures; and
   an enumeration data-structure, wherein the enumeration data structure comprises information used to generate the address of each instance of the cell.

6. The method of claim 5, wherein the hybrid-hierarchical representation comprises an iterator algorithm, the iterator algorithm performs iteration on the enumeration data structure of a cell to generate the address of each instance of the cell.

7. The method of claim 5, wherein the enumeration data-structure is a Partial Data Acyclic Graph (PDAG), wherein a PDAG of a cell is a subset of a DAG, the PDAG of the cell includes each ancestor of the cell, each existing link between each pair of ancestors in the DAG, and each existing link between the cell and each parent of the cell in the DAG.

8. The method of claim 3, wherein a cell in the hybrid-flat representation of structural data comprises a third pointer to the raw-geometry component of the database, wherein the raw-geometry component comprises zero or more geometrical figures.

9. The method of claim 8, wherein the top cell in the hybrid-flat representation comprises information corresponding to a bounding-box corresponding to each instantiation of each cell in a set of cells, the third pointer of each cell in the set of cells includes address of one or more geometrical figures corresponding to a cell.

10. The method of claim 1, wherein the hierarchical representation is converted to the hybrid-hierarchical representation using a specific flattening algorithm and the extracted structural data, spatial data and raw-geometry data.

11. The method of claim 1, wherein the flat representation of structural data comprises a top cell, the top cell comprises a fourth pointer to the raw-geometry component of the database, wherein the raw-geometry component comprises zero or more geometrical figures.

12. The method of claim 1, wherein the hybrid-hierarchical representation is converted to the hybrid-flat representation using a specific flattening algorithm and the extracted structural data, spatial data and raw-geometry data.

13. The method of claim 1, wherein the hierarchical representation is converted to the hybrid-flat representation using a specific flattening algorithm and the extracted structural data, spatial data and raw-geometry data.

14. The method of claim 1, wherein performing comprises:
 a. aggregating at least one of:
  i. at least one result of the at least one predefined computing operation performed on at least one of the extracted structural data, the extracted spatial data, and the extracted raw-geometry data to generate an aggregated result; and
  ii. the extracted structural data, the extracted spatial data and the extracted raw-geometry data; and
 b. storing the aggregated result in at least one output data-format file.

15. A system for processing geometrical layout design data in a computer readable data-format file for developing post-layout Electronic Data Automation (EDA) applications, the system comprising:
 memory; and
 a processor operatively coupled to the memory, wherein the processor is configured to execute instructions in the memory to:
  extract structural data, spatial data, and raw-geometry data from the geometrical layout design data in the computer readable data-format file into a respective structural, spatial, and raw-geometry components in a database, wherein the raw-geometry data is dimensional, topological, and user-defined data of a plurality of geometrical figures in the geometrical layout design data;
  process the extracted data in the database to represent the geometrical layout design data in at least one of a flat representation, a hierarchical-flat representation, a hierarchical representation, and a hybrid-hierarchical representation; and
  perform at least one predefined computing operation on the at least one of the flat representation, the hierarchical-flat representation, the hierarchical representation, and the hybrid-hierarchical representation for developing post-layout EDA applications.

16. A computer readable storage device having instructions, which when executed by a computer, cause the computer to perform a method for processing geometrical layout design data in a computer readable data-format file for developing post-layout Electronic Data Automation (EDA) applications, the method comprising:
 extracting structural data, spatial data, and raw-geometry data from the geometrical layout design data in the computer readable data-format file into a respective structural, spatial, and raw-geometry components in a database, wherein the raw-geometry data is dimensional, topological, and user-defined data of a plurality of geometrical figures in the geometrical layout design data;
 processing the extracted data in the database to represent the geometrical layout design data in at least one of a flat representation, a hierarchical-flat representation, a hierarchical representation, and a hybrid-hierarchical representation; and
 performing at least one predefined computing operation on the at least one of the flat representation, the hierarchical-flat representation, the hierarchical representation, and the hybrid-hierarchical representation for developing post-layout EDA applications.

* * * * *